(12) United States Patent
Maseedu et al.

(10) Patent No.: US 12,432,589 B2
(45) Date of Patent: Sep. 30, 2025

(54) INCREASING UTILIZATION OF UEs USED IN TESTING A WIRELESS TELECOMMUNICATION NETWORK

(71) Applicant: T-Mobile USA, Inc., Bellevue, WA (US)

(72) Inventors: Phaneendra Maseedu, Everett, WA (US); Bryan Ehaw Song, Sammamish, WA (US); Junjie Lin, Bellevue, WA (US); Kevin Tran, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 443 days.

(21) Appl. No.: 17/951,056

(22) Filed: Sep. 22, 2022

(65) Prior Publication Data

US 2024/0107342 A1    Mar. 28, 2024

(51) Int. Cl.
    *H04W 8/00*      (2009.01)
    *H04W 8/18*      (2009.01)
    (Continued)

(52) U.S. Cl.
    CPC ........... *H04W 24/08* (2013.01); *H04W 8/005* (2013.01); *H04W 8/18* (2013.01); *H04W 8/22* (2013.01); *H04W 24/06* (2013.01); *H04W 24/10* (2013.01); *H04W 72/51* (2023.01); *H04W 72/535* (2023.01); *H04W 72/566* (2023.01); *H04W 84/02* (2013.01); *H04W 88/02* (2013.01);
    (Continued)

(58) Field of Classification Search
    CPC .......... H04B 17/0082–3913; H04M 3/22–367;
    H04W 8/005–245; H04W 16/02–225; H04W 24/02–10; H04W 72/50–569; H04W 84/005–22; H04W 88/005–188; H04W 92/02–24
    See application file for complete search history.

(56) References Cited

U.S. PATENT DOCUMENTS

| 6,859,649 B1 | 2/2005 | Denenberg et al. |
| 7,006,820 B1 | 2/2006 | Parker et al. |

(Continued)

FOREIGN PATENT DOCUMENTS

| CN | 101889458 B | 1/2016 |
| CN | 102640525 B | 12/2016 |

(Continued)

*Primary Examiner* — Timothy J Weidner
(74) *Attorney, Agent, or Firm* — Perkins Coie LLP

(57) ABSTRACT

The system obtains multiple unique identifiers associated with multiple UEs, where a unique identifier among the multiple unique identifiers identifies a UE among the multiple UEs. Based on the unique identifier, the system determines multiple technical capabilities associated with the multiple UEs. The system receives a request for one or more UEs, where the request includes a number of the one or more UEs and a desired technical capability associated with the one or more UEs, and where the request is specified at a level of abstraction that allows more than one UE among the multiple UEs to satisfy the request. Based on the request for the one or more UEs and the multiple technical capabilities associated with the multiple UEs, the system determines a subset of the multiple UEs satisfying the request, and sends a response to the request indicating the subset of the multiple UEs satisfying the request.

19 Claims, 6 Drawing Sheets

(51) Int. Cl.

| | | |
|---|---|---|
| *H04W 8/22* | (2009.01) | |
| *H04W 24/06* | (2009.01) | |
| *H04W 24/08* | (2009.01) | |
| *H04W 24/10* | (2009.01) | |
| *H04W 72/50* | (2023.01) | |
| *H04W 72/51* | (2023.01) | |
| *H04W 72/566* | (2023.01) | |
| *H04W 84/02* | (2009.01) | |
| *H04W 88/02* | (2009.01) | |
| *H04W 88/08* | (2009.01) | |
| *H04W 88/12* | (2009.01) | |
| *H04W 88/18* | (2009.01) | |
| *H04W 92/02* | (2009.01) | |
| *H04W 92/10* | (2009.01) | |
| *H04W 92/12* | (2009.01) | |

(52) U.S. Cl.
 CPC ............ *H04W 88/08* (2013.01); *H04W 88/12* (2013.01); *H04W 88/18* (2013.01); *H04W 92/02* (2013.01); *H04W 92/10* (2013.01); *H04W 92/12* (2013.01)

(56) References Cited

U.S. PATENT DOCUMENTS

| | | |
|---|---|---|
| 7,450,900 B2 | 11/2008 | Van |
| 7,512,401 B2 | 3/2009 | Muhonen et al. |
| 7,603,106 B2 | 10/2009 | Aaltonen et al. |
| 7,653,001 B2 | 1/2010 | Agrawal et al. |
| 7,835,722 B2 | 11/2010 | Munje et al. |
| 7,849,135 B2 | 12/2010 | Agrawal et al. |
| 7,860,951 B2 | 12/2010 | Gil et al. |
| 7,961,883 B2 | 6/2011 | Bajar et al. |
| 8,106,742 B2 | 1/2012 | Marshall et al. |
| 8,180,364 B2 | 5/2012 | Fano et al. |
| 8,189,548 B2 | 5/2012 | Caldwell et al. |
| 8,190,198 B1 | 5/2012 | Venkataramu |
| 8,224,312 B2 | 7/2012 | Boiero et al. |
| 8,311,557 B2 | 11/2012 | Annamalai |
| 8,340,658 B2 | 12/2012 | Tsui et al. |
| 8,452,903 B2 | 5/2013 | Bolton et al. |
| 8,718,592 B2 | 5/2014 | Annamalai |
| 9,125,132 B1 | 9/2015 | Rai et al. |
| 9,560,657 B2 | 1/2017 | Ekici et al. |
| 9,699,649 B2 | 7/2017 | Shanmugam et al. |
| 9,749,884 B1 | 8/2017 | Cummings |
| 9,819,734 B1 | 11/2017 | Frederick et al. |
| 9,838,991 B1 | 12/2017 | Campbell et al. |
| 9,924,347 B1 | 3/2018 | Chastain et al. |
| 10,015,764 B2 | 7/2018 | Chastain et al. |
| 10,084,922 B2 | 9/2018 | Soini et al. |
| 11,006,268 B1 | 5/2021 | Kim et al. |
| 12,167,500 B2 * | 12/2024 | Di Girolamo .......... H04W 8/24 |
| 2003/0130864 A1 | 7/2003 | Ho et al. |
| 2003/0162553 A1 | 8/2003 | Huang et al. |
| 2004/0192299 A1 | 9/2004 | Wilson et al. |
| 2004/0203903 A1 | 10/2004 | Wilson et al. |
| 2005/0143097 A1 | 6/2005 | Wilson et al. |
| 2005/0233733 A1 | 10/2005 | Roundtree et al. |
| 2011/0014923 A1 | 1/2011 | Krco et al. |
| 2012/0295550 A1 | 11/2012 | Wilson et al. |
| 2022/0070946 A1 | 3/2022 | Shah |

FOREIGN PATENT DOCUMENTS

| | | |
|---|---|---|
| CN | 107925870 A | 4/2018 |
| CN | 112425130 A | 2/2021 |
| CN | 109155794 B | 8/2021 |
| CN | 113534048 A | 10/2021 |
| CN | 110506439 B | 5/2022 |
| DE | 112008002356 T5 | 7/2010 |
| EP | 2127407 A1 | 12/2009 |
| EP | 2190245 A1 | 5/2010 |
| EP | 1518435 B1 | 2/2012 |
| EP | 2452301 A1 | 5/2012 |
| EP | 2712450 A1 | 4/2014 |
| EP | 2775408 A1 | 9/2014 |
| EP | 2885944 A1 | 6/2015 |
| EP | 2891341 A1 | 7/2015 |
| EP | 2582115 B1 | 12/2015 |
| EP | 2974512 A1 | 1/2016 |
| EP | 3202172 A1 | 8/2017 |
| EP | 2744273 B1 | 4/2018 |
| EP | 2478718 B1 | 12/2018 |
| EP | 3446427 A1 | 2/2019 |
| EP | 2552139 B1 | 8/2019 |
| EP | 2962066 B1 | 3/2020 |
| EP | 3714549 A1 | 9/2020 |
| EP | 3732917 A1 | 11/2020 |
| EP | 3739529 A1 | 11/2020 |
| EP | 3782391 A1 | 2/2021 |
| EP | 3937456 A1 | 1/2022 |
| JP | 2007534009 A | 11/2007 |
| JP | 2014510482 A | 4/2014 |
| JP | 2014512611 A | 5/2014 |
| JP | 2015525992 A | 9/2015 |
| JP | 5993051 B2 | 8/2016 |
| JP | 6104874 B2 | 3/2017 |
| JP | 6268438 B2 | 1/2018 |
| JP | 2018528505 A | 9/2018 |
| JP | 6453466 B2 | 12/2018 |
| JP | 2018193145 A | 12/2018 |
| JP | 2020502958 A | 1/2020 |
| KR | 20000064508 A | 11/2000 |
| KR | 100691537 B1 | 3/2007 |
| KR | 101226421 B1 | 1/2013 |
| KR | 20140144256 A | 12/2014 |
| KR | 101599171 B1 | 3/2016 |
| KR | 20160132362 A | 11/2016 |
| KR | 101752379 B1 | 6/2017 |
| KR | 20170087885 A | 7/2017 |
| KR | 20200044105 A | 4/2020 |
| KR | 102288207 B1 | 8/2021 |
| WO | 2007094816 A2 | 8/2007 |
| WO | 2008059254 A1 | 5/2008 |
| WO | 2010037321 A1 | 4/2010 |
| WO | 2010102149 A2 | 9/2010 |
| WO | 2012087393 A1 | 6/2012 |
| WO | 2013060164 A1 | 5/2013 |
| WO | 2015100272 A1 | 7/2015 |
| WO | 2015148052 A1 | 10/2015 |
| WO | 2016005795 A1 | 1/2016 |
| WO | 2018064575 A1 | 4/2018 |
| WO | 2018182897 A1 | 10/2018 |
| WO | 2018195106 A1 | 10/2018 |
| WO | 2018237351 A1 | 12/2018 |
| WO | 2019184859 A1 | 10/2019 |
| WO | 2020142327 A1 | 7/2020 |
| WO | 2020180111 A1 | 9/2020 |
| WO | 2021021020190 A1 | 2/2021 |
| WO | 2021046798 A1 | 3/2021 |
| WO | 2021108606 A1 | 6/2021 |

* cited by examiner

INCREASING UTILIZATION OF UEs USED IN TESTING A WIRELESS TELECOMMUNICATION NETWORK

BACKGROUND

Wireless telecommunication networks, including 5G networks, involve continuous updates to the infrastructure and software of the network. Prior to the updates being released to the public, the updates need to be tested to ensure proper performance when the updates are released. Normally, the testing is done using UEs dedicated to testing, and when the UEs are not used in tests, they remain idle.

BRIEF DESCRIPTION OF THE DRAWINGS

Detailed descriptions of implementations of the present invention will be described and explained through the use of the accompanying drawings.

Figure 1:
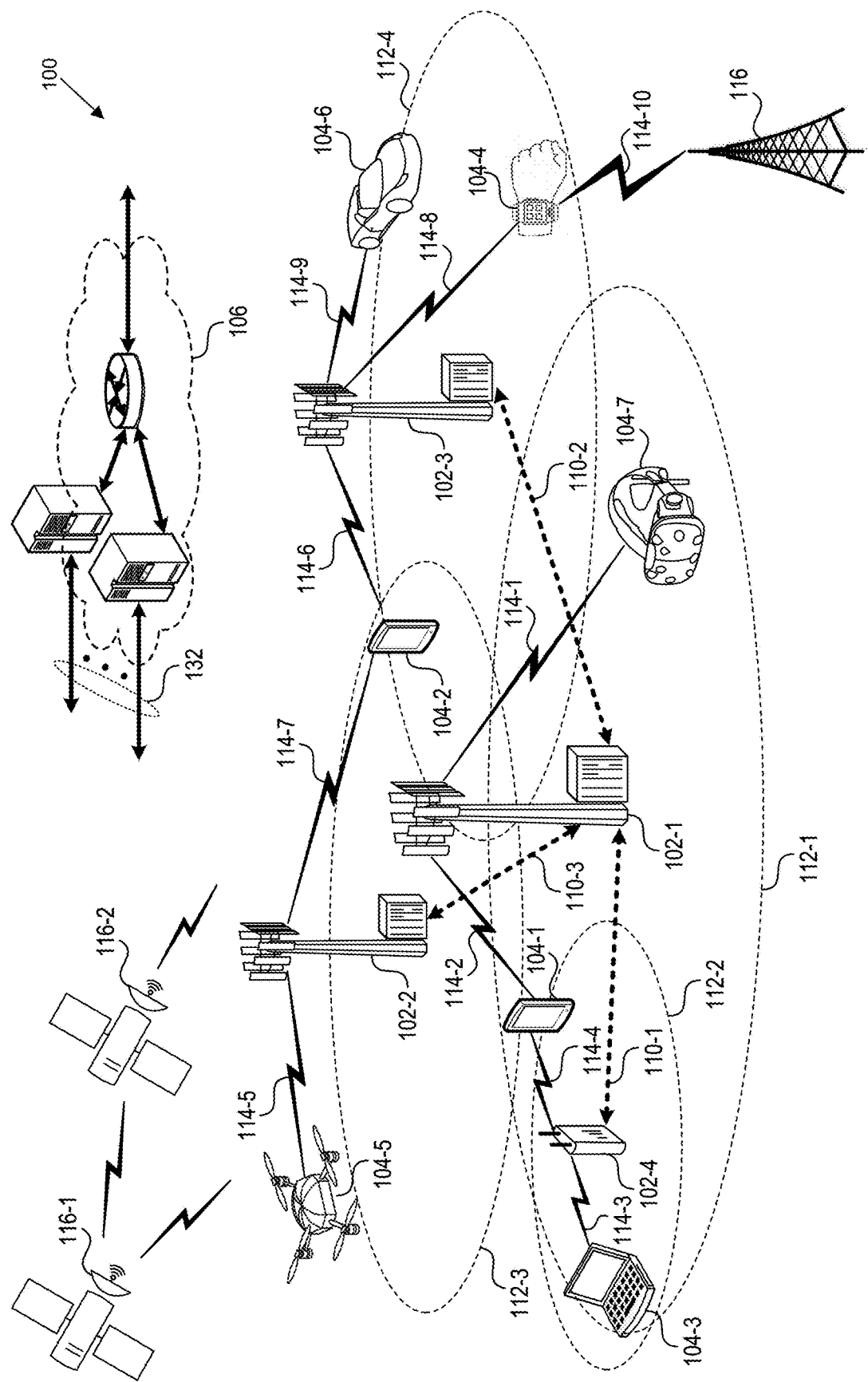
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Described here is a system and method to increase utilization of multiple mobile devices used in testing a wireless telecommunication network. Increasing utilization can include decreasing idle time of the mobile devices and decreasing the total number of mobile devices needed to perform network testing. The system increases utilization of the multiple mobile devices by allowing the user performing the test to request devices at a level of abstraction including device capabilities, as opposed to requesting mobile devices by their unique identifiers. The system allows a single mobile device to participate in multiple tests requiring various technical capabilities. The system also allows other mobile devices to take the place of the requested mobile device if the requested mobile device is busy and the other mobile devices have the requested technical capabilities.

The system obtains multiple unique identifiers associated with the multiple mobile devices, where a unique identifier among the multiple unique identifiers identifies a mobile device among the multiple mobile devices. Unique the identifier can include a phone number associated with the mobile device, or an international mobile equipment identity (IMEI) associated with the device. Based on the unique identifier, the system can determine multiple technical capabilities associated with the multiple mobile devices.

The system receives a request for one or more mobile devices to be used in testing, where the request includes a number of the one or more mobile devices and a desired technical capability associated with the one or more mobile devices. The request can be specified at a level of abstraction that allows more than one mobile device among the multiple mobile devices to satisfy the request. For example, the level of abstraction associated with the request may not include the unique identifier which identifies only one mobile device.

Based on the request for the one or more mobile devices and the multiple technical capabilities associated with the multiple mobile devices, the system determines a subset of the mobile devices satisfying the request. The system sends a response to the request indicating the subset of the mobile devices satisfying the request.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (ARNR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultra-high quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
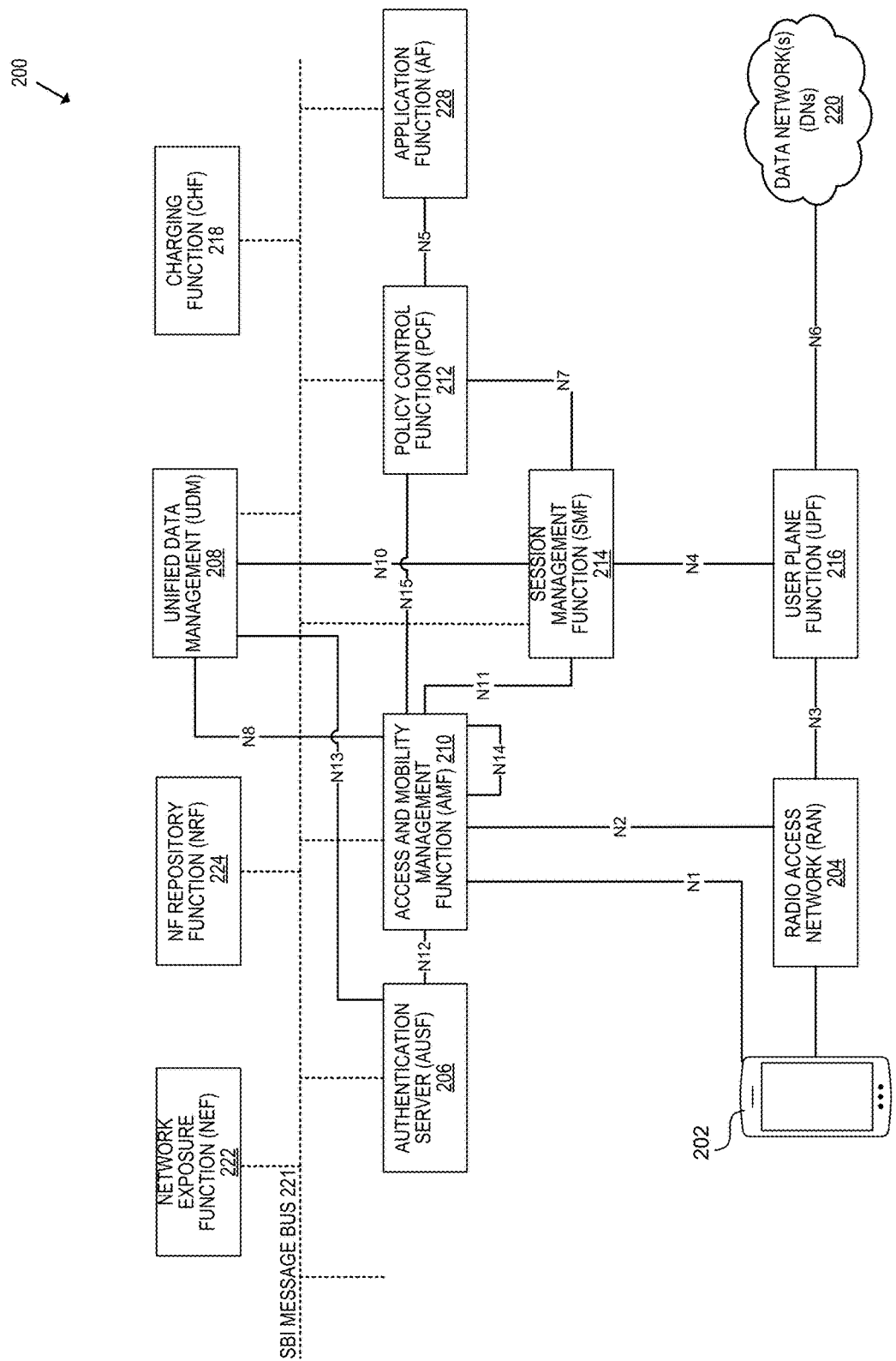
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a Radio Access Network (RAN) 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical quality of service (QoS) and charging rules, includes network slice selection, which is regulated by the NSSF 226.

Figure 3:
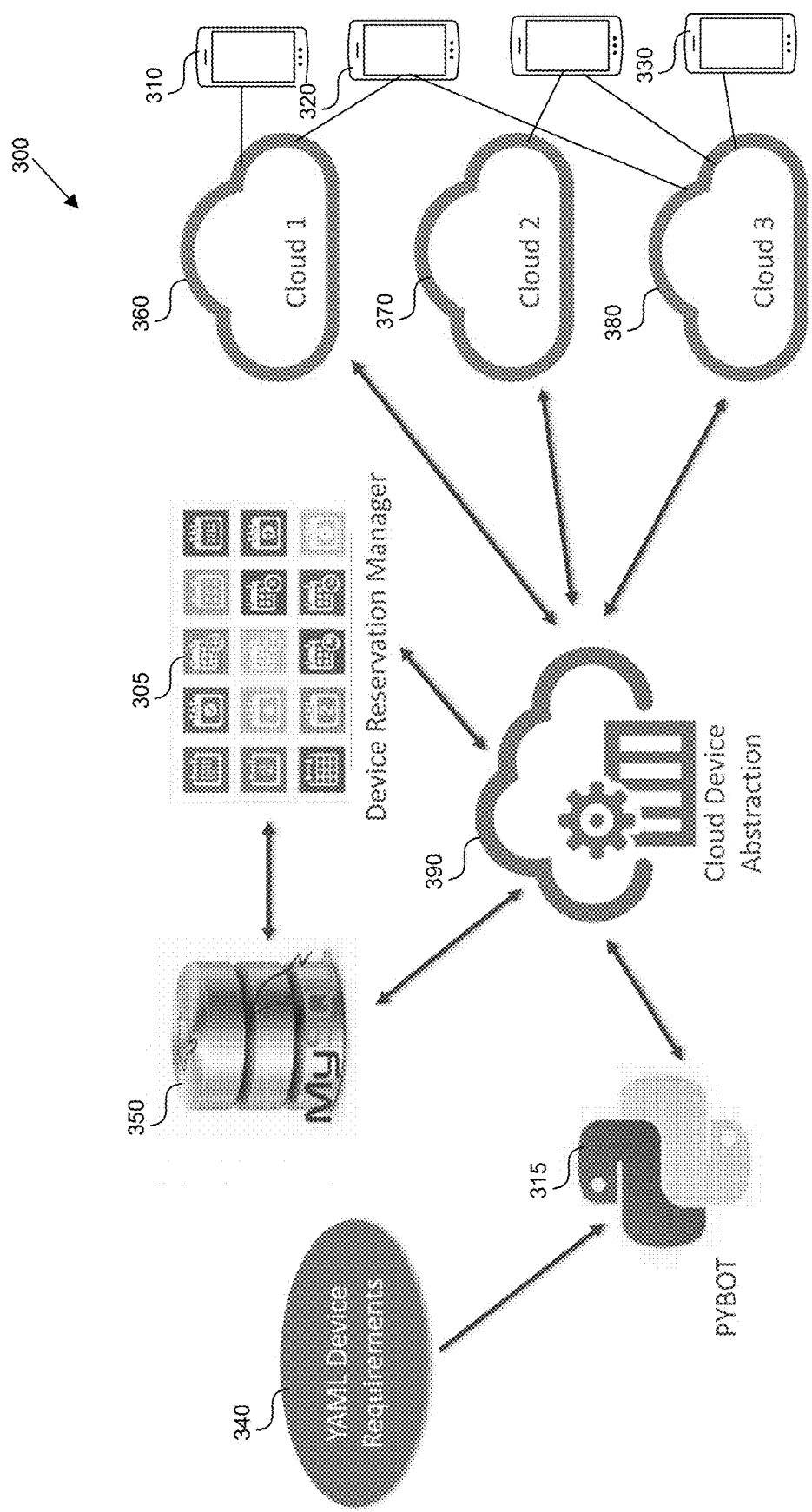
FIG. 3 shows a diagram of a system used in increasing utilization of multiple UEs used in testing and decreasing the number of the multiple UEs needed.

Increasing Utilization of UEs Used in Testing a Wireless Telecommunication Network FIG. 3 shows a diagram of a system 300 used in increasing utilization of multiple UEs used in testing and decreasing the number of the multiple UEs needed. Traditionally the multiple UEs 310, 320, 330 (only three labeled for brevity) used in testing have been uniquely identified using the phone number of the UE, an international mobile equipment identity (IMEI) associated with the device, or a device identifier (ID). A user wanting to test an update to the network 100 in FIG. 1 would request the UE using the unique identifier. When the UE used in testing fails, replacing the UE is difficult because no other UE is associated with the unique identifier. In addition, this technique of uniquely identifying the requested UE causes the network 100 to maintain a high number of UEs, most of which sit idle between tests.

The system 300 allows the user to request a UE 310, 320, 330 for testing using one or more requirements 340, which describe the technical specifications of the UE at a high level, such that more than one UE can satisfy the requirements 340.

The requirements 340 can include type, model, OS version, special software, engineered device, specific native device configuration, application specific device configuration, device specific capabilities, SIM specific capabilities, lab, production, or network under test. Type indicates the type of the device such as iPhone, Google, Samsung, Nokia, LG, etc. Model identifies the particular model of the phone such as iPhone X, Pixel 5, Samsung Galaxy, etc. The OS version indicates the operating system installed on the UE. The special software indicates whether the UE needs to have a special software installed, such as a speed test software, which is a software not generally installed on UEs. The engineered device is a device that has been modified by the network 100 to, for example, grant access to the network to the device logs. Specific device configuration includes whether the device is a 4G device or a 5G device, or the network configuration of the device, such as whether the device is configured for rich text communication or for voice over LTE, whether the device is configured for Wi-Fi communication and data communication, etc. Device specific capabilities include whether the device is a 4G device or a 5G device, whether the device can operate as a standalone (SA) system, a non-standalone (NSA) system, or both an SA and an NSA system. Subscriber identity module (SIM) specific capabilities indicate whether the SIM card is prepaid or postpaid. Lab or production indicates whether the UE is used only for testing or whether the UE is used by a user of the network 100.

Certain of the requirements, such as make, model, OS version, special software, engineered device, and device specific capabilities, can be hard requirements, and if the UE 310, 320, 330 does not meet the criteria for appropriate make or model, the UE cannot be used to satisfy the requirement. However, certain of the requirements including some hard requirements, such as OS version, special software, engineered device, application specific configuration, and specific native device configuration, can be soft requirements, and the UE 310, 320, 330 can be configured to satisfy the requirements even if it does not initially meet the criteria. For example, if a special software is required on the UE 310, 320, 330, the network 100 can install the required software. If the UE 310, 320, 330 needs to be configured for rich text communication, the network 100 can configure the device appropriately. The UE 310, 320, 330 can be configured for voice over LTE, if needed. If needed, the UE 310, 320, 330 can be configured to connect to a particular access point network (APN). The UE 310, 320, 330 can be configured to connect to Wi-Fi, to data, or to a particular Wi-Fi address based on the requirements.

For example, the requirement can request a 4G device with roaming enabled, and the system 300 can find a 4G device and can configure the 4G device to enable roaming.

The system 300 can group the UEs into one or more device pools 360, 370, 380. Each device pool 360, 370, 380 is an equivalence class grouping UEs 310, 320 that have the same requirement and the same value of the requirement. For example, the requirement can indicate the special software, and the value of the requirement can include speedtest software. The device pool 360 can then include all the UEs 310, 320 that have the speed software installed. The UEs 310, 320 need not otherwise be identical. For example, the UE 310 can be a 5G device, while the UE 320 can be a 4G device, however because they satisfy the same requirement, namely they have a special software installed, the UEs 310, 320 can be grouped into the device pool 360. As can be seen in FIG. 3, one UE 310, 320, 330 can belong to multiple device pools 360, 370, 380.

The system 300 includes a database 350 which stores the technical capabilities of the UEs 310, 320, 330. The database 350 can store the requirements and value of the requirements associated with each device pool 360, 370, 380.

When the device abstraction layer 390 receives a requirement 340 for a UE 310, 320, 330, the device abstraction layer 390 can request from the database 350 the unique ID of the UE 310, 320, 330 that satisfies the requirement, or the device abstraction layer 390 can request the unique ID of the device pool 360, 370, 380 that matches the requirement. The device abstraction layer 390 can run on the cloud.

The reservation manager 305 can keep a schedule associated with the UE 310, 320, 330. When the UE 310, 320, 330 matches the incoming requirement 340, the reservation manager 305 can determine whether the UE 310, 320, 330 is free, or is being used in testing. If the UE 310, 320, 330 is being used in testing, the reservation manager 305 can indicate that the UE is busy, and the device abstraction layer 390 can determine another UE satisfying the requirement. The reservation manager 305 can keep a pool of available UEs, and when a UE 310, 320, 330 is done performing a task, the reservation manager 305 can return the UE to the pool of available devices. When a request for a particular UE comes in, the reservation manager 305 can check whether the particular UE is in the pool of available devices. The reservation manager 305 requires an explicit request to release a reservation of the devices no longer needed. The reservation manager 305 can timeout reservation if the devices are never released. Also, the reservation manager 305 can be requested to extend the reservation beyond a default timeout.

The system 300 can provide redundancy so that when a requirement comes in, the system allocates more than the number of requested devices. In that case, when a UE 310, 320, 330 under test fails, the system 300 can resume testing the remainder of the devices. In another example, when a UE 310, 320, 330 under test fails, the system 300 can find another UE satisfying the same requirements based on the device pools 360, 370, 380.

Element 315 can provide an interface between the user-specified requirements 340 and the device abstraction layer 390. Element 315 can translate the user-specified requirements 340 to a format that the device abstraction layer 390 can understand. However, the element 315 is not necessary, and the device abstraction layer 390 can communicate with the user directly and receive the requirements 340. The element 315 can be written in Python, and can include the client library with which other programs can integrate.

Figure 4:
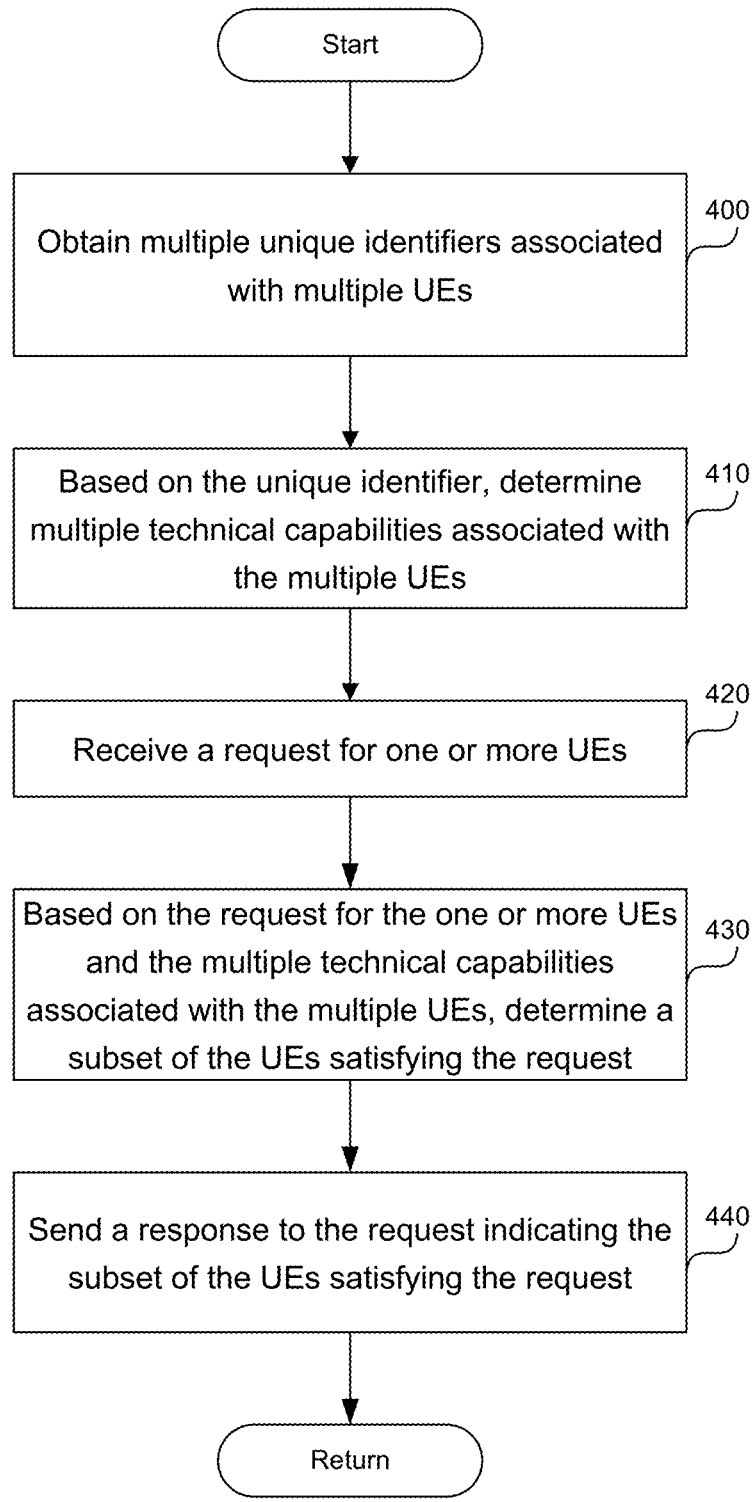
FIG. 4 is a flowchart of a method to decrease a number of multiple mobile devices used in testing a wireless telecommunication network.

FIG. 4 is a flowchart of a method to decrease a number of multiple mobile devices used in testing a wireless telecommunication network. In step 400, a hardware or software processor described in this application can obtain multiple unique identifiers associated with multiple UEs, where a unique identifier among the multiple unique identifiers identifies a UE among the multiple UEs. The unique identifier can include a phone number associated with the UE, an international mobile equipment identity (IMEI) associated with the device, or a device ID.

In step 410, based on the unique identifier, the processor can determine multiple technical capabilities associated with the multiple UEs. In step 420, the processor can receive a request for one or more UEs, where the request includes a number of the one or more UEs and a desired technical capability associated with the one or more UEs. The request can be specified at a level of abstraction that allows more than one UE among the multiple UEs to satisfy the request. For example, the level of abstraction of the request does not include the unique identifier which identifies only one device. However, the system can work even if the level of abstraction of the request includes the unique identifier.

Based on the request for the one or more UEs and the multiple technical capabilities associated with the multiple UEs, in step 430, the processor can determine a subset of the multiple UEs satisfying the request. In step 440, the processor can send a response to the request indicating the subset of the multiple UEs satisfying the request.

The processor can create device pools of UEs satisfying the same requirement. In one embodiment, the processor can determine the multiple technical capabilities associated with the multiple UEs. The technical capability can be the same as the requirement. The technical capability among the multiple technical capabilities can include a type associated with a UE, a model associated with the UE, an operating system version associated with the UE, a software associated with the UE, whether the device has been modified by an operator associated with the wireless telecommunication network, network configuration associated with the device, device specific capabilities such as radio bands accessible by the UE, subscriber identity module (SIM) card capabilities, and whether the UE is a lab device or a production device. The processor can obtain a first name associated with a first technical capability among the multiple technical capabilities, and a first value associated with the first technical capability; for example, technical capability can be device specific capability, and the value can be 5G and both SA and NSA. The processor can create a device pool including a second multiplicity of UEs, where each UE in the second multiplicity of UEs has the first technical capability and the first value associated with the first technical capability. Upon receiving the request for one or more UEs, the processor can separate the request into a second name of a second technical capability associated with the request, and a second value associated with the second technical capability. The processor can determine the subset of the multiple UEs satisfying the request by determining that the first name and the second name match and that the first value and the second value match, and determining the subset of the multiple UEs to be the device pool.

In another embodiment, to create the device pools, the processor can determine the multiple technical capabilities associated with the multiple UEs, where a technical capability among the multiple technical capabilities includes: a type associated with a UE, a model associated with the UE, an operating system version associated with the UE, a software associated with the UE, whether the device has been modified by an operator associated with the wireless telecommunication network, network configuration associated with the device, radio bands accessible by the UE, subscriber identity module (SIM) card capabilities, and whether the UE is a lab device or a production device. The processor can obtain a name associated with a particular technical capability among the multiple technical capabilities, and a particular value associated with the particular technical capability. The processor can create a device pool including a second multiplicity of UEs, where each UE in the second multiplicity of UEs has the particular technical capability and the particular value associated with the particular technical capability.

The processor can keep a reservation schedule to determine which UEs are available for testing. The processor can create a schedule indicating whether the UE among the multiple UEs is being used in testing or whether the UE is available. The processor can receive the request for the one or more UEs to be used in testing, where the request indicates a timeframe during which to perform the test. Based on the timeframe and the schedule, the processor can determine whether the UE is available. Upon determining that the UE is available and that a technical capability associated with the UE satisfies the desired technical capability associated with the request, the processor can include the UE in the subset of UEs.

The processor can provide redundant UEs for testing to ensure smooth completion of the test even if one or more of the devices under test fail. The processor can receive the request for one or more UEs to be used in testing, where the request includes the number of the one or more UEs. Upon determining the subset of the multiple UEs satisfying the request, the processor can allocate a portion of the subset of the multiple UEs satisfying the request, where the portion of the subset of the multiple UEs are used in testing, and where a number of the portion of the subset of the multiple UEs exceeds the number of the one or more UEs. The processor can determine that a UE among the portion of the subset of the multiple UEs has failed during testing. The processor can remove the failed UE from the portion of the subset of the multiple UEs used in testing without replacing the failed UE, because there are redundant devices under test.

The processor can swap a UE under test if the UE under test fails. The processor can receive the request for one or more UEs to be used in testing, where the request includes the number of the one or more UEs. The processor can separate the subset of the multiple UEs satisfying the request into a first portion of the UEs and a second portion of the UEs. The processor can allocate for testing the first portion of the UEs, where a number of UEs in the first portion of the UEs matches or exceeds the number of the one or more UEs. The processor can determine that a UE among the portion of the subset of the multiple UEs has failed during testing. The processor can replace the failed UE with the UE from the second portion of the UEs.

The processor can configure the UE for testing over a 5G network 100. The processor can receive the request for one or more UEs to be used in testing, where the request indicates a radio band associated with a 5G spectrum. The processor can determine whether the UE has a technical capability to communicate using a 5G wireless telecommunication network. Upon determining that the UE has a technical capability to communicate using the 5G wireless telecommunication network, the processor can configure the UE to communicate over the radio band associated with the request. The processor can include the configured UE in the subset of UEs satisfying the request. The processor can perform other network configurations such as rich text communication, voice over LTE, access point network, Wi-Fi on the device, mobile date on the device, connecting to a particular Wi-Fi network, etc.

Figure 5:
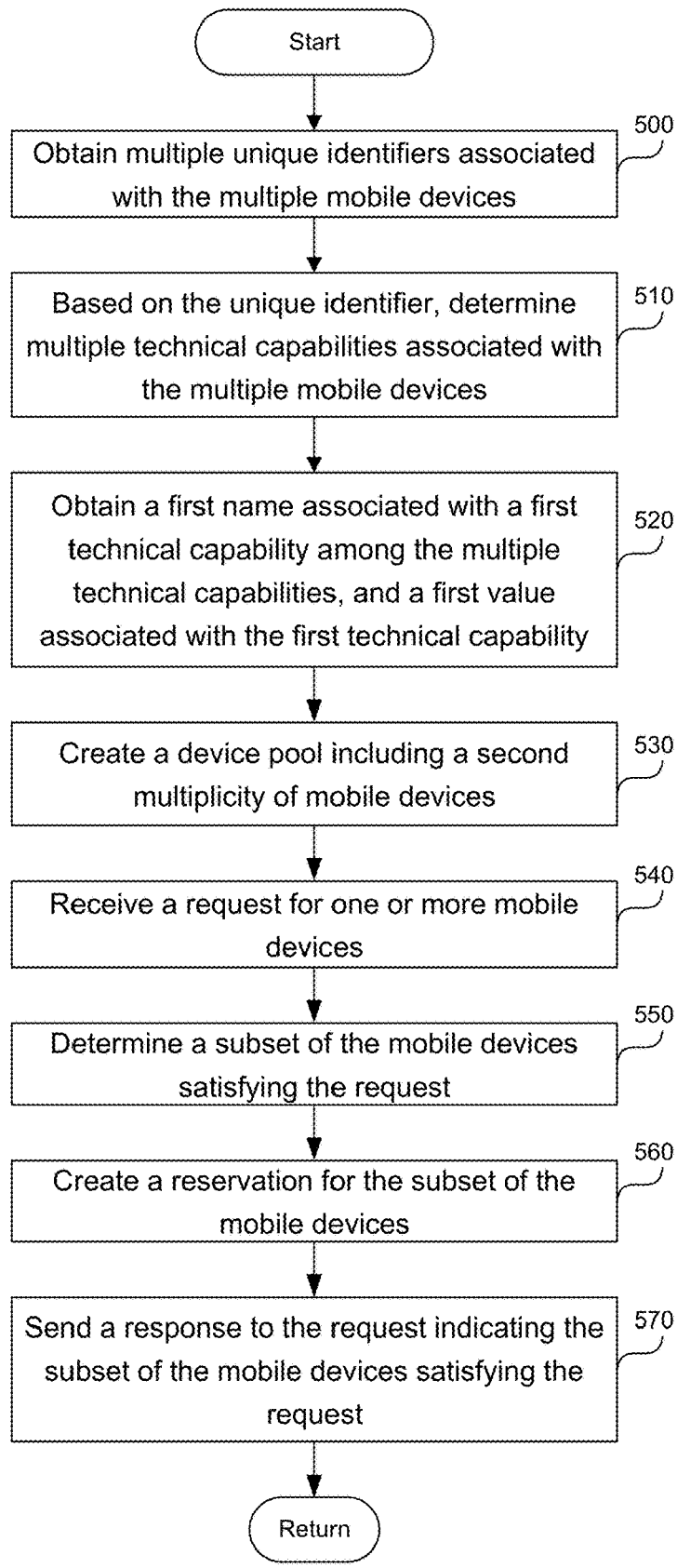
FIG. 5 is a flowchart of a method to create device pools to be used in network testing.

FIG. 5 is a flowchart of a method to create device pools to be used in network testing. In step 500, a processor can obtain multiple unique identifiers associated with the multiple mobile devices, where a unique identifier among the multiple unique identifiers identifies a mobile device among the multiple mobile devices. The unique identifier can include a phone number associated with the mobile device, an international mobile equipment identity (IMEI) associated with the device, or a device ID.

Based on the unique identifier, in step 510, the processor can determine multiple technical capabilities associated with the multiple mobile devices, where a technical capability among the multiple technical capabilities includes at least three of: a type associated with a mobile device, a model associated with the mobile device, an operating system version associated with the mobile device, a software associated with the mobile device, whether the device has been modified by an operator associated with the wireless telecommunication network, network configuration associated with the device, radio bands accessible by the mobile device, subscriber identity module (SIM) card capabilities, and whether the mobile device is a lab device or a production device.

In step 520, the processor can obtain a first name associated with a first technical capability among the multiple technical capabilities, and a first value associated with the first technical capability. The technical capability can be a device specific capability, and the value can be 5G and both SA and NSA.

In step 530, the processor can create a device pool including a second multiplicity of mobile devices, where each mobile device in the second multiplicity of mobile devices has the first technical capability and the first value associated with the first technical capability. Alternatively, the user can manually define the device pool.

In step 540, the processor can receive a request for one or more mobile devices, where the request includes a second name of a second technical capability associated with the request, and a second value associated with the second technical capability.

In step 550, the processor can determine a subset of the mobile devices satisfying the request by determining that the first name and the second name match and that the first value and the second value match, and determining the subset of the mobile devices to be the device pool. In step 560, the processor can create a reservation for the subset of the mobile devices. In step 570, the processor can send a response to the request indicating the subset of the mobile devices satisfying the request.

The processor can receive the request for one or more mobile devices to be used in testing, where the request includes a number of the one or more mobile devices and a desired technical capability associated with the one or more mobile devices, and where the request is specified at a level of abstraction that allows more than one mobile device among the multiple mobile devices to satisfy the request. Based on the request for the one or more mobile devices and the multiple technical capabilities associated with the multiple mobile devices, the processor can determine the subset of the mobile devices satisfying the request. The processor can send the response to the request indicating the subset of the mobile devices satisfying the request. The processor can perform other steps described in this application.

Computer System

Figure 6:
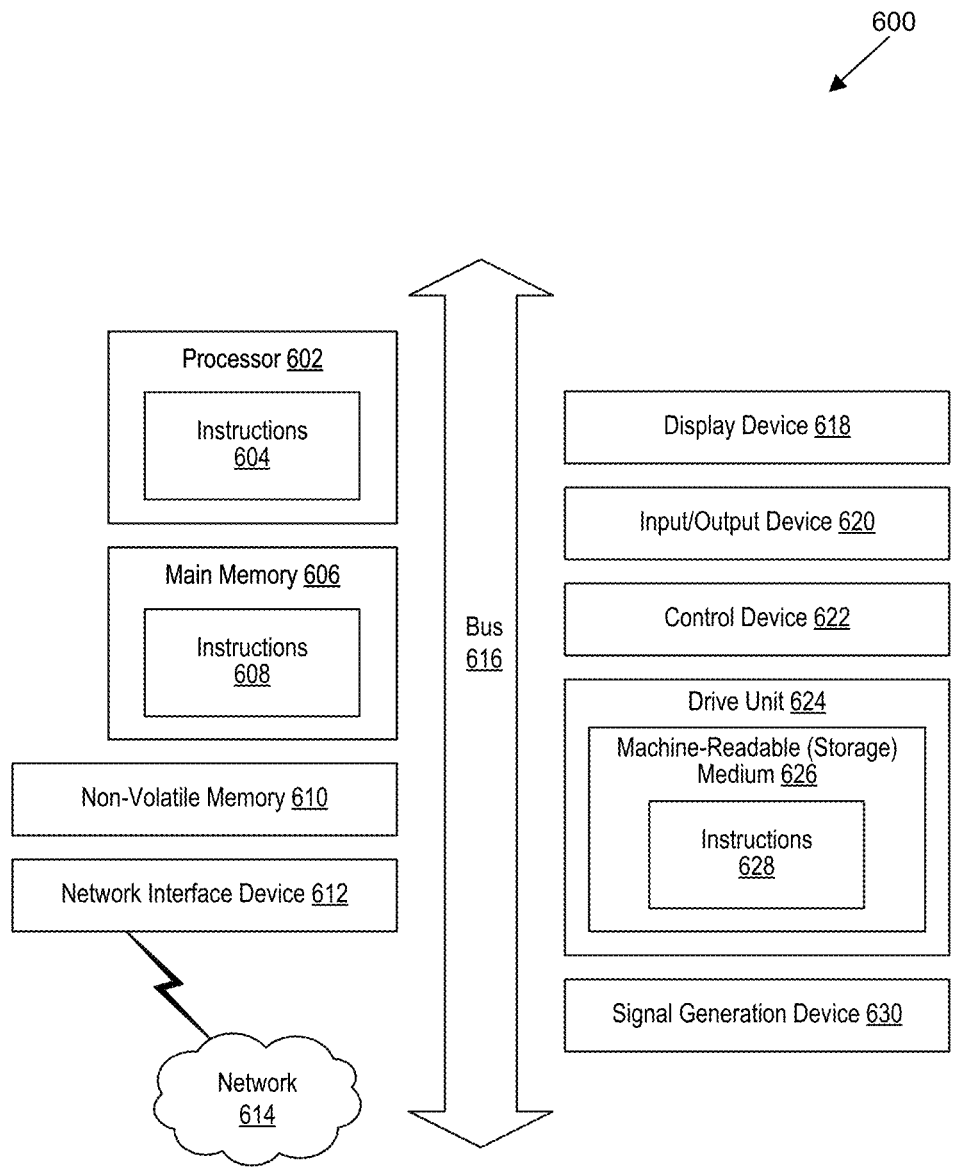
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the Figures and any other components described in this specification can be implemented.

The computer system 600 can take any suitable physical form. For example, the computer system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real time, near real time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references can mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. At least one computer-readable storage medium, excluding transitory signals and carrying instructions to decrease a number of multiple mobile devices used in testing a wireless telecommunication network, which, when executed by at least one data processor of a system, cause the system to:

obtain multiple unique identifiers associated with the multiple mobile devices,
wherein a unique identifier among the multiple unique identifiers identifies a mobile device among the multiple mobile devices, and
wherein the unique identifier includes a phone number associated with the mobile device, an international mobile equipment identity (IMEI) associated with the mobile device, or a device ID;

based on the multiple unique identifiers, determine multiple technical capabilities associated with the multiple mobile devices;

receive a request for one or more mobile devices to be used in testing the wireless telecommunication network,
wherein the request includes a number of the one or more mobile devices and a desired technical capability associated with the one or more mobile devices,
wherein the request is specified at a level of abstraction that allows more than one mobile device among the multiple mobile devices to satisfy the request;

based on the request for the one or more mobile devices and the multiple technical capabilities associated with the multiple mobile devices, determine a subset of the mobile devices satisfying the request;

create a reservation for the subset of the mobile devices satisfying the request; and send a response to the request indicating the subset of the mobile devices satisfying the request to thereby cause the subset of the mobile devices to perform actions for testing of the wireless telecommunications network.

2. The computer-readable storage medium of claim 1, comprising instructions to:

determine the multiple technical capabilities associated with the multiple mobile devices,
wherein a technical capability among the multiple technical capabilities includes at least three of: a type associated with a mobile device, a model associated with the mobile device, an operating system version associated with the mobile device, a software associated with the mobile device, whether the mobile device has been modified by an operator associated with the wireless telecommunication network, network configuration associated with the mobile device, radio bands accessible by the mobile device, subscriber identity module (SIM) card capabilities, and whether the mobile device is a lab device or a production device;

obtain a first name associated with a first technical capability among the multiple technical capabilities, and a first value associated with the first technical capability;

create a device pool including a second multiplicity of mobile devices,
wherein each mobile device in the second multiplicity of mobile devices has the first technical capability and the first value associated with the first technical capability;

upon receiving the request for one or more mobile devices, separate the request into a second name of a second technical capability associated with the request, and a second value associated with the second technical capability; and determine the subset of the mobile devices satisfying the request by:
determining that the first name and the second name match, and that the first value and the second value match;
determining the subset of the mobile devices to be the device pool.

3. The computer-readable storage medium of claim 1, comprising instructions to:

determine the multiple technical capabilities associated with the multiple mobile devices,
wherein a technical capability among the multiple technical capabilities includes at least three of: a type associated with a mobile device, a model associated with the mobile device, an operating system version associated with the mobile device, a software associated with the mobile device, whether the device has been modified by an operator associated with the wireless telecommunication network, network configuration associated with the device, radio bands accessible by the mobile device, subscriber identity module (SIM) card capabilities, and whether the mobile device is a lab device or a production device;

obtain a name associated with a particular technical capability among the multiple technical capabilities, and a particular value associated with the particular technical capability; and create a device pool including a second multiplicity of mobile devices, wherein each mobile device in the second multiplicity of mobile devices has the particular technical capability and the particular value associated with the particular technical capability.

4. The computer-readable storage medium of claim 1, comprising instructions to:

create a schedule indicating whether the mobile device among the multiple mobile devices is being used in testing or whether the mobile device is available;

receive the request for the one or more mobile devices to be used in testing, wherein the request indicates a timeframe during which to perform a test;

based on the timeframe and the schedule, determine whether the mobile device is available; and upon determining that the mobile device is available and that a technical capability associated with the mobile device satisfies the desired technical capability associated with the request, include the mobile device in the subset of the mobile devices.

5. The computer-readable storage medium of claim 1, comprising instructions to:

receive the request for one or more mobile devices to be used in testing,
wherein the request includes the number of the one or more mobile devices;

upon determining the subset of the mobile devices satisfying the request, allocate a portion of the subset of the mobile devices satisfying the request,
wherein the portion of the subset of the mobile devices are used in testing,
wherein a number of the portion of the subset of the mobile devices exceeds the number of the one or more mobile devices;

determine that a mobile device among the portion of the subset of the mobile devices has failed during testing; and remove the failed mobile device from the portion of the subset of the mobile devices used in testing, without replacing the failed mobile device.

6. The computer-readable storage medium of claim 1, comprising instructions to:
receive the request for one or more mobile devices to be used in testing, wherein the request includes the number of the one or more mobile devices;
separate the subset of the mobile devices satisfying the request into a first portion of the mobile devices and a second portion of the mobile devices;
allocate for testing the first portion of the mobile devices, wherein a number of mobile devices in the first portion of the mobile devices matches or exceeds the number of the one or more mobile devices;
determine that a mobile device among the portion of the subset of the mobile devices has failed during testing; and
replace the failed mobile device with the mobile device from the second portion of the mobile devices.

7. The computer-readable storage medium of claim 1, comprising instructions to:
receive the request for one or more mobile devices to be used in testing, wherein the request indicates a radio band associated with a 5G spectrum;
determine whether the mobile device has a technical capability to communicate using a 5G wireless telecommunication network;
upon determining that the mobile device has a technical capability to communicate using the 5G wireless telecommunication network, configure the mobile device to communicate over the radio band associated with the request; and
include the configured mobile device in the subset of the mobile devices satisfying the request.

8. A system comprising:
at least one hardware processor; and
at least one non-transitory memory storing instructions, which, when executed by the at least one hardware processor, cause the system to:
obtain multiple unique identifiers associated with multiple UEs,
wherein a unique identifier among the multiple unique identifiers identifies a UE among the multiple UEs;
based on the unique identifier, determine multiple technical capabilities associated with the multiple UEs,
wherein a technical capability among the multiple technical capabilities includes at least three of: a type associated with a UE, a model associated with the UE, an operating system version associated with the UE, a software associated with the UE, whether the UE has been modified by an operator associated with a wireless telecommunication network, network configuration associated with the UE, radio bands accessible by the UE, subscriber identity module (SIM) card capabilities, and whether the UE is a lab device or a production device;
obtain a name associated with a particular technical capability among the multiple technical capabilities, and a particular value associated with the particular technical capability;
create a device pool including a second multiplicity of UEs, wherein each UE in the second multiplicity of UEs has the particular technical capability and the particular value associated with the particular technical capability:
receive a request for one or more UEs,
wherein the request includes a number of the one or more UEs and a desired technical capability associated with the one or more UEs,
wherein the request is specified at a level of abstraction that allows more than one UE among the multiple UEs to satisfy the request;
based on the request for the one or more UEs and the multiple technical capabilities associated with the multiple UEs, determine a subset of the multiple UEs satisfying the request; and
send a response to the request indicating the subset of the multiple UEs satisfying the request.

9. The system of claim 8, comprising instructions to:
determine the multiple technical capabilities associated with the multiple UEs,
wherein a technical capability among the multiple technical capabilities includes at least three of: a type associated with a UE, a model associated with the UE, an operating system version associated with the UE, a software associated with the UE, whether the UE has been modified by an operator associated with a wireless telecommunication network, network configuration associated with the UE, radio bands accessible by the UE, subscriber identity module (SIM) card capabilities, and whether the UE is a lab device or a production device;
obtain a first name associated with a first technical capability among the multiple technical capabilities, and a first value associated with the first technical capability;
create a device pool including a second multiplicity of UEs,
wherein each UE in the second multiplicity of UEs has the first technical capability and the first value associated with the first technical capability;
upon receiving the request for one or more UEs, separate the request into a second name of a second technical capability associated with the request, and a second value associated with the second technical capability; and
determine the subset of the multiple UEs satisfying the request by:
determining that the first name and the second name match, and that the first value and the second value match;
determining the subset of the multiple UEs to be the device pool.

10. The system of claim 8, comprising instructions to:
create a schedule indicating whether the UE among the multiple UEs is being used in testing or whether the UE is available;
receive the request for the one or more UEs to be used in testing, wherein the request indicates a timeframe during which to perform a test;
based on the timeframe and the schedule, determine whether the UE is available; and
upon determining that the UE is available and that a technical capability associated with the UE satisfies the desired technical capability associated with the request, include the UE in the subset of the multiple UEs satisfying the request.

11. The system of claim 8, comprising instructions to:
receive the request for one or more UEs to be used in testing, wherein the request includes the number of the one or more UEs;
upon determining the subset of the multiple UEs satisfying the request, allocate a portion of the subset of the multiple UEs satisfying the request, wherein the portion of the subset of the multiple UEs are used in testing,
wherein a number of the portion of the subset of the multiple UEs exceeds the number of the one or more UEs;
determine that a UE among the portion of the subset of the multiple UEs has failed during testing; and
remove the failed UE from the portion of the subset of the multiple UEs used in testing, without replacing the failed UE.

12. The system of claim 8, comprising instructions to:
receive the request for one or more UEs to be used in testing, wherein the request includes the number of the one or more UEs;
separate the subset of the multiple UEs satisfying the request into a first portion of the UEs and a second portion of the UEs;
allocate for testing the first portion of the UEs,
wherein a number of UEs in the first portion of the UEs matches or exceeds the number of the one or more UEs;
determine that a UE among the portion of the subset of the multiple UEs has failed during testing; and
replace the failed UE with the UE from the second portion of the UEs.

13. The system of claim 8, comprising instructions to:
receive the request for one or more UEs to be used in testing, wherein the request indicates a radio band associated with a 5G spectrum;
determine whether the UE has a technical capability to communicate using a 5G wireless telecommunication network;
upon determining that the UE has a technical capability to communicate using the 5G wireless telecommunication network, configure the UE to communicate over the radio band associated with the request; and
include the configured UE in the subset of the multiple UEs satisfying the request.

14. A system comprising:
at least one hardware processor, and
at least one non-transitory memory storing instructions, which, when executed by the at least one hardware processor, cause the system to:
obtain multiple unique identifiers associated with multiple UEs,
wherein a unique identifier among the multiple unique identifiers identifies a UE among the multiple UEs,
wherein the unique identifier includes a phone number associated with the UE, an international mobile equipment identity (IMEI) associated with the UE, or a device ID;
based on the unique identifier, determine multiple technical capabilities associated with the multiple UEs,
wherein a technical capability among the multiple technical capabilities includes at least three of: a type associated with a UE, a model associated with the UE, an operating system version associated with the UE, a software associated with the UE, whether the UE has been modified by an operator associated with a wireless telecommunication network, network configuration associated with the UE, radio bands accessible by the UE, subscriber identity module (SIM) card capabilities, and whether the UE is a lab device or a production device;
obtain a first name associated with a first technical capability among the multiple technical capabilities, and a first value associated with the first technical capability;
create a device pool including a second multiplicity of UEs,
wherein each UE in the second multiplicity of UEs has the first technical capability and the first value associated with the first technical capability;
receive a request for one or more UEs,
wherein the request includes a second name of a second technical capability associated with the request, and a second value associated with the second technical capability; and
determine a subset of the multiple UEs satisfying the request by:
determining that the first name and the second name match, and that the first value and the second value match;
determining the subset of the multiple UEs to be the device pool; and
send a response to the request indicating the subset of the multiple UEs satisfying the request.

15. The system of claim 14, including instructions to:
receive the request for one or more UEs to be used in testing,
wherein the request includes a number of the one or more UEs and a desired technical capability associated with the one or more UEs,
wherein the request is specified at a level of abstraction that allows more than one UE among the multiple UEs to satisfy the request;
based on the request for the one or more UEs and the multiple technical capabilities associated with the multiple UEs, determine the subset of the multiple UEs satisfying the request; and
send the response to the request indicating the subset of the multiple UEs satisfying the request.

16. The system of claim 14, comprising instructions to:
create a schedule indicating whether the UE among the multiple UEs is being used in testing or whether the UE is available;
receive the request for the one or more UEs to be used in testing, wherein the request indicates a timeframe during which to perform a test,
wherein the request includes a desired technical capability associated with the one or more UEs;
based on the timeframe and the schedule, determine whether the UE is available; and
upon determining that the UE is available and that a technical capability associated with the UE satisfies the desired technical capability associated with the request, include the UE in the subset of the multiple UEs satisfying the request.

17. The system of claim 14, comprising instructions to:
receive the request for one or more UEs to be used in testing, wherein the request includes the number of the one or more UEs;
upon determining the subset of the multiple UEs satisfying the request, allocate a portion of the subset of the multiple UEs satisfying the request,
wherein the portion of the subset of the multiple UEs are used in testing,
wherein a number of the portion of the subset of the multiple UEs exceeds the number of the one or more UEs;

determine that a UE among the portion of the subset of the multiple UEs has failed during testing; and remove the failed UE from the portion of the subset of the multiple UEs used in testing, without replacing the failed UE.

18. The system of claim 14, comprising instructions to:

receive the request for one or more UEs to be used in testing, wherein the request includes the number of the one or more UEs;

separate the subset of the multiple UEs satisfying the request into a first portion of the UEs and a second portion of the UEs;

allocate for testing the first portion of the UEs,
wherein a number of UEs in the first portion of the UEs matches or exceeds the number of the one or more UEs;

determine that a UE among the portion of the subset of the multiple UEs has failed during testing; and replace the failed UE with the UE from the second portion of the UEs.

19. The system of claim 14, comprising instructions to:

receive the request for one or more UEs to be used in testing, wherein the request indicates a radio band associated with a 5G spectrum;

determine whether the UE has a technical capability to communicate using a 5G wireless telecommunication network;

upon determining that the UE has a technical capability to communicate using the 5G wireless telecommunication network, configure the UE to communicate over the radio band associated with the request; and include the configured UE in the subset of the multiple UEs satisfying the request.

* * * * *